United States Patent [19]

Pellegrini

[11] Patent Number: 4,575,622
[45] Date of Patent: Mar. 11, 1986

[54] ELECTRONIC ACCESS CONTROL SYSTEM FOR COIN-OPERATED GAMES AND LIKE SELECTIVELY ACCESSIBLE DEVICES

[75] Inventor: Frank J. Pellegrini, Hoffman Estates, Ill.

[73] Assignee: ESAC, Inc., Hillside, Ill.

[21] Appl. No.: 518,426

[22] Filed: Jul. 29, 1983

[51] Int. Cl.$^4$ .............................................. G06K 5/00
[52] U.S. Cl. ................................. 235/382; 235/382.5
[58] Field of Search ............................. 235/382, 382.5

[56] References Cited

U.S. PATENT DOCUMENTS 3,906,447 9/1975 Crafton ................................. 235/382

Primary Examiner—Harold I. Pitts
Attorney, Agent, or Firm—Emrich & Dithmar

[57] ABSTRACT

An access control system for coin operated games and the like in its preferred embodiment includes cards with magnetic strips carrying identifications of the cards. The cards are obtained from a card dispenser in response to deposit of money. A keyboard is used to enter data into a computer to create a data control for determining which cards are valid for uses of the electronic games. Alternatively, the card dispenser can communicate the identification of cards being dispensed to the computer. The user takes the card and inserts it into a card reader which is located at the game selected for play. The card reader reads the card and determines whether the card contains proper corporate and site identifications. If so, the card reader communicates the card identification to the computer which determines, by examining data record for that card, whether any further game plays are alloted to that card. If there are further game plays, the computer adjusts its data record to decrease the number of remaining plays which will be permitted, and activates the selected game. After a predetermined number of game activations for any particular card, the computer will disallow further activations so that the card is no longer valid. At that point, the card can be returned to a card dispenser which can read the card identification of the returned card and communicate that information to the computer which can revalidate the card for use when it is again dispensed in response to deposit of money. This system provides secure control over electronic equipment because the computer record and the means for creating it are located at a secure location.

33 Claims, 9 Drawing Figures

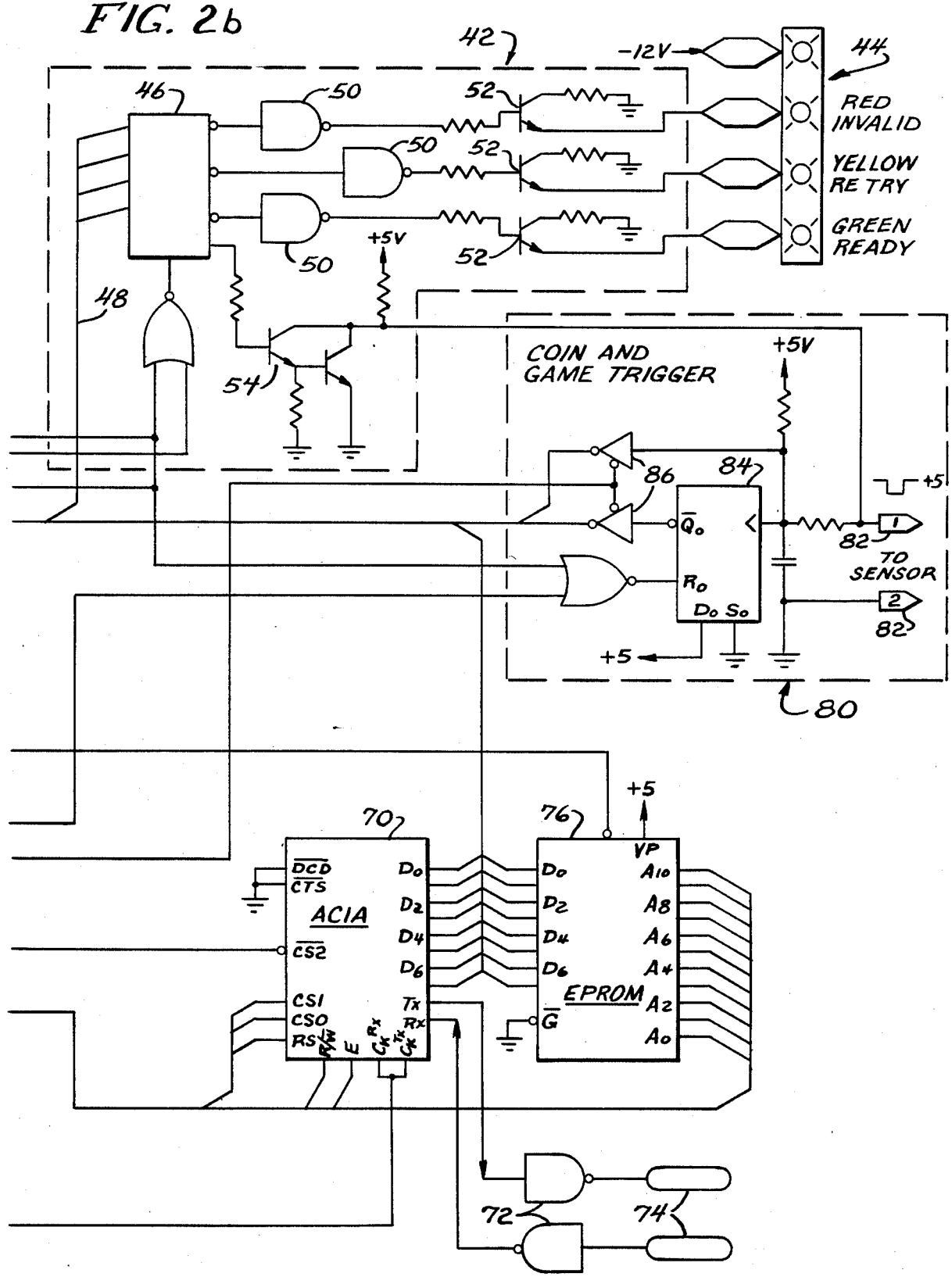

INTERFACE

ELECTRONIC ACCESS CONTROL SYSTEM FOR COIN-OPERATED GAMES AND LIKE SELECTIVELY ACCESSIBLE DEVICES

BACKGROUND OF THE INVENTION

The present invention is concerned with controlling access to equipment. The preferred embodiment relates to a system for controlling access to and usage of electronic equipment such as arcade video games where a user (player) pays a fee for each use of the arcade game.

Arcade games are a large industry today. Generally, an arcade will be located in a shopping mall or the like, and it will contain numerous video games. These games in general are activated by the insertion of one or more quarters into a coin slot. Alternatively, tokens can be used. In this latter mode, the user purchases tokens and inserts one or more of them into a slot on the arcade game which will have electrical apparatus therein to recognize the tokens.

There has been a substantial problem of collecting the full amount of money for the actual use of such token-operated and coin-operated devices, and particularly arcade video games. This is because tokens frequently can be purchased at remote gaming centers where the price per token is lower than the price per token at the arcade location where the tokens in fact are used. In other words, one could travel to a less popular gaming center and purchase eight tokens for one dollar, and then return to a popular gaming center where tokens command a higher price (e.g. four for one dollar) and use his tokens on the arcade games there. Consequently, the arcade center loses potential revenue through this form of larceny.

Another problem with existing arcade games and other coin-operated devices resides in embezzlement or outright pilferage wherein floor managers or token sellers of the arcade game center sell tokens to customers. These managers or token sellers generally have access to the arcade games and are in a position to sell tokens without reporting the sales to management. Thus, tokens are removed from the game and sold to customers without any revenue passing to the arcade owner. In this fashion, the arcade owner loses revenue to the dishonest managers.

Finally, there is the problem of outright theft by persons who have access to the interior of the arcade games, where those games receive coins.

Consequently, it is an object of the present invention to provide a secure control over the access to devices which in the past have been operated by coins or tokens.

Another object of the present invention is to provide a system which accurately accounts for revenues generated in response to uses of such game devices or other devices.

A further object is to provide a system which is easy for members of the public or other prospective users of the equipment to operate.

Still a further object of the present invention is to provide a system which has accurate reporting capabilities.

SUMMARY OF THE INVENTION

The foregoing and other objects of the invention are achieved by providing a system wherein prospective users of the equipment to which access is to be controlled, instead of purchasing tokens or using coins directly, purchase a data carrying device such as a plastic card which has a magnetic stripe on it for storing information. Such card, in the preferred embodiment, will have been previously encoded so that an identification code and certain other information, such as the location of the equipment on which those plays can occur, will be stored on the card. A data center, preferably a computer, will be or will have been advised via a data entry device that the identification number associated with the card has been validated, and the data center will establish or will previously have established a record in memory for the number of plays allotted to the card. The card can be dispensed automatically by a card dispenser which has been loaded with encoded cards. Such a card dispenser will receive money, automatically dispense a card where data is validated for a pre-determined number of game plays and then automatically account on-line for all money taken in.

Next, the user approaches the arcade game he has selected for play and runs the card through a card reader associated uniquely with the selected game. The card reader communicates with the computer and transmits the card identification and other information stored on the card to the computer. The system checks its memory to determine whether that particular card identification number, the site identification, and other information, are proper. If so, the data center activates the arcade game and adjusts the stored data to reflect the current use of the card. Games which required multiple coins or tokens in the past are accounted for in the data center by making an appropriate change in the data stored in the memory.

Subsequent uses of the arcade game selected by the user or any other arcade game at the same arcade center are achieved by placing the card through the corresponding reader and repeating the entire process. Eventually, the number of uses for which the card was originally validated will have been used, and the user will find that the system will not activate the arcade game despite the proper insertion of the card in the card reader which is associated with the game unit. At this point, the card may either be discarded or returned to the operator via the dispenser or other means. Such returned card can be reactivated by the operator via the data entry device or other means communicating with the data center.

Even if the user attempts to alter the card, he will not be able to succeed in gaining access to the arcade game because an alteration in the data base of the data center is required. However, the arcade operator controls access to the computer and its stored data by locating it in a secure location.

The architecture which is used in the preferred embodiment of the present invention includes a respective card reader associated with each arcade game. Each card reader communicates with the data center (a computer) via a single control unit. The control unit includes up to sixteen interface boards, each including sixteen ports, each communicating with a respective arcade game. Thus, in the preferred embodiment, up to 256 arcade games can be based on a single control unit, which communicates with a computer. Both the control unit and the computer can be located in a secure location which is remote from the arcade games themselves.

BRIEF DESCRIPTION OF THE DRAWINGS

In describing a preferred embodiment of the present invention, reference is made to the accompanying drawings wherein:

FIGS. 2a and 2b are circuit diagrams of electronic circuitry associated with the card reader located at the site of the arcade game;

DESCRIPTION OF A PREFERRED EMBODIMENT

Figure 1:
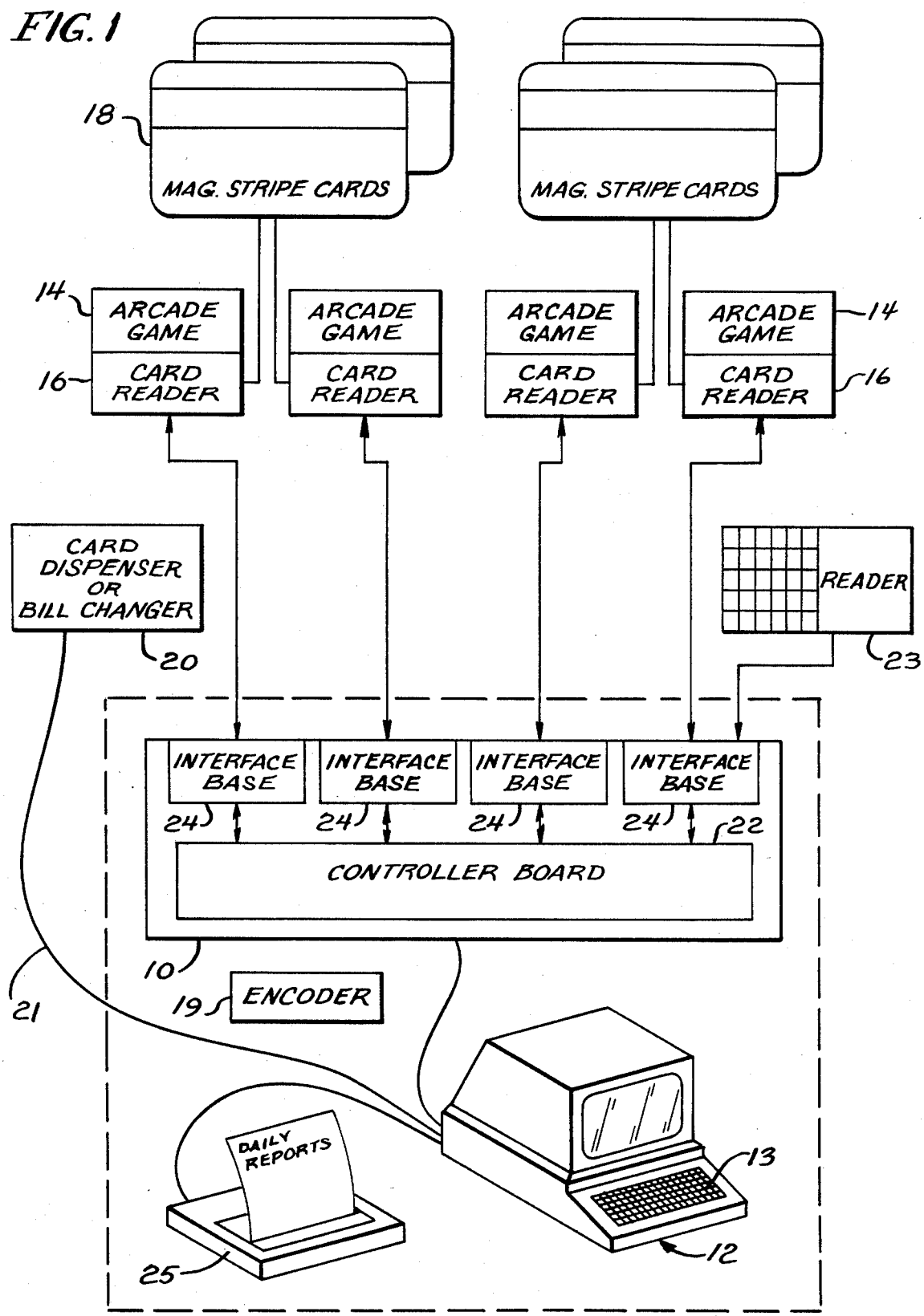
FIG. 1 is a block diagram showing a system embodying various aspects of the present invention.

FIG. 1 (not to scale) illustrates a system according to various aspects of the present invention. This system includes a control unit 10 cooperating with a computer 12 having a keyboard 13 for data entry and a plurality of arcade games 14 each having a respective card reader 16 associated therewith. Representative cards 18 are shown in FIG. 1 for use with the card readers 16. Further included are an encoder 19 and a card dispenser 20 which communicates with control unit 10.

Control unit 10 contains a controller board 22 which communicates with typically sixteen interface boards 24. Each interface board can communicate with a plurality of arcade games. In the preferred embodiment, each interface board 24 can communicate with sixteen arcade games. Further, each arcade game can be remotely located from control unit 10, separated by a distance typically of up to at least two hundred feet. This permits the control unit to be located remotely from the entire arcade game area so that access can be restricted to the control unit. The computer 12 can be located close to the control unit, and typically will be associated within the same general housing or will be located at the same station represented by dotted line 26.

The particular type of device to which access can be restricted through the use of the present invention is not limited to arcade games. In particular, applications in the hotel industry, vending industry and industrial time clocks are envisioned. It will be appreciated that these other applications are within the spirit and scope of the invention. Any necessary interfacing for different applications would be apparent to anyone skilled in the art who is familiar with the teachings of this application. Consequently, the arcade game which is contemplated by the preferred embodiment is not illustrated or described in detail in this specification. With reference to more detailed figures, however, a coin sensor or coin trigger (in the arcade game housing) is shown. It is to be understood that corresponding circuitry or electromechanical elements can be used when applying the present invention to equipment other than arcade games.

With reference to FIG. 1, a card 18 will be inserted by a prospective game user in a card reader 16 associated with a game 14 which the card holder wants to play. The card reader is a device which is available commercially. For example, a standard magnetic stripe card reader sold by Magtek is appropriate. Similarly, like equipment from other manufacturers could be used in this application. In the preferred embodiment, however, a further printed circuit board is included in or associated with the card reader 16, and this circuit is described with reference to FIGS. 2, 3 and 4. When the card reader 18 is inserted in the card reader 16, the primary function of the card reader 16 is to format the data carried on the card, perform various checks, and communicate the data to the control unit 10. Specifically, card reader 16 checks the data against corporate and site identification and validates parity. If the corporate and site identification are proper, then card reader 16 sends the data to control unit 10. The primary function of control unit 10 is to route data between the several card readers and computer 12. Thus, control unit 10 signals the computer 12 that communication is necessary and ultimately transmits data to the computer 12 after appropriate handshaking protocols. Computer 12 then determines whether card 18 is valid, as explained below, and based on the results of the validation examination, returns a command to control unit 10. Within control unit 10, controller board 22 activates a signal for a command to trigger the arcade game 14.

Bill disperser 20 is arranged to accept one dollar bills and five dollar bills. It signals the computer 12 via control unit 10 upon receipt of cash and it dispenses magnetic striped cards appropriately. Typically, each card which is dispensed will be valid for four plays, and such a card will be sold for one dollar. In exchange for receipt of five dollars, which can be determined using existing commercially available equipment, another type of card can be dispensed or change may be given. The dispensing of cards and receipt of money can be monitored by computer 12. However, a primary purpose of computer 12 is to maintain a data record of the valid cards and the number of game plays assocsiated with each card.

This data record can be established in a variety or ways. Preferably, however, a quantity of cards 18 will be encoded by the use of an encoder, such as a Farrington Model 2000 made by Farrington Business Systems, Inc. or any other commercial encoder. Each card can be encoded with a unique identification including, for example, a corporate identification (which identifies the user of the system), a site identification (to identify which particular arcade location the card may be used at), a date of issue, a card number, and an LRC (longitudinal redundancy check).

This data or selected parts of it will be loaded into computer 12 via a data entry device such as keyboard 13 which communicates with it. Computer 12 will be programmed by the arcade owner or operator so that it knows that card numbers 10200 through 18200, for example, are valid for four uses each. This data creates a data record in memory associated with computer 12. The encoded cards can be loaded into dispenser 20 either before or after "validating" them by use of the data entry device 13. In any event, however, this arrangement is configured so that only one person can validate cards and have access to them before dispensing so that opportunities for fraud are minimized. By the time a card 18 is dispensed by dispenser 20, that card will have been validated for a predetermined number of plays. Thus, dispenser 20 need not communicate with computer 12 for this operation.

Further functions of the computer are to keep track of cash flow and generate reports, which can be outputted on a printer 25. Such reports can include an analysis of which arcade game is shown to be most popular, its actual usage, times of use, coin usage, card usage, and down time. The analysis can be done on daily, weekly, or monthly bases, as desired. Such an information system is important to the arcade owner or operator, and can be programmed in conventional manners.

When a user inserts his card in a card reader 16, the computer 12 will do a look-up operation based on the data obtained from the card. If, for example, the data record is programmed to permit four plays to the card issued by the dispenser, the computer checks to see if the data record shows zero plays left. If not, it decrements the stored data and will now permit the requested single play. Its data record now shows that only three plays remain for (the bearer of) the card. In this fashion, data which is stored remotely from the game user is adjusted from time to time based on actual use, thus providing a secure system.

In one modification of the preferred embodiment, to induce users of return "spent" cards to the operator, card dispenser 20 can be made to issue a free valid card to users who return a certain number of used cards. When cards are returned to the card dispenser, dispenser 20 reads the identification numbers on each card and communicates those numbers to computer 12. For this purpose, dispenser 20 can communicate with computer 12 via a line 21. Computer 12 can reactivate that identification number so that the same card, without changing the data carried on it, can be dispensed again to a user for game usage.

Additionally, the present system can permit manual validation of cards based on, for example, purchases of services or goods. For example, a ten dollar purchase can entitle the purchaser to two "free" games. This is accomplished via a keypad 23 unit such as a Saho Authorizer SA-600 made by Saho Corp. of Taipei, Taiwan which includes a reader portion and a keypad. A purchaser presents a card, or obtains one from the operator, and in conjunction with the purchase of goods or services, the card is swiped through keypad unit 23 so that the data on the card is read and sent to computer 12 directly or via control unit 10. Also, the keypad keys are pressed to indicate the amount of purchase, and this too is sent to computer 12 which determines that such purchase amount merits an award, e.g. two free plays. Computer 12 then looks up its data record for that card and increments it for two further plays. If no record exists yet, it creates one for the two plays.

Additionally, the present invention in its preferred embodiment contemplates that actual coins can be used as an adjunct to the card system. Accordingly, the card reader 16 can monitor the coin drop on the arcade game 14 so that the computer 12 can keep track of coins being used at that particular arcade game.

Figure 2A:
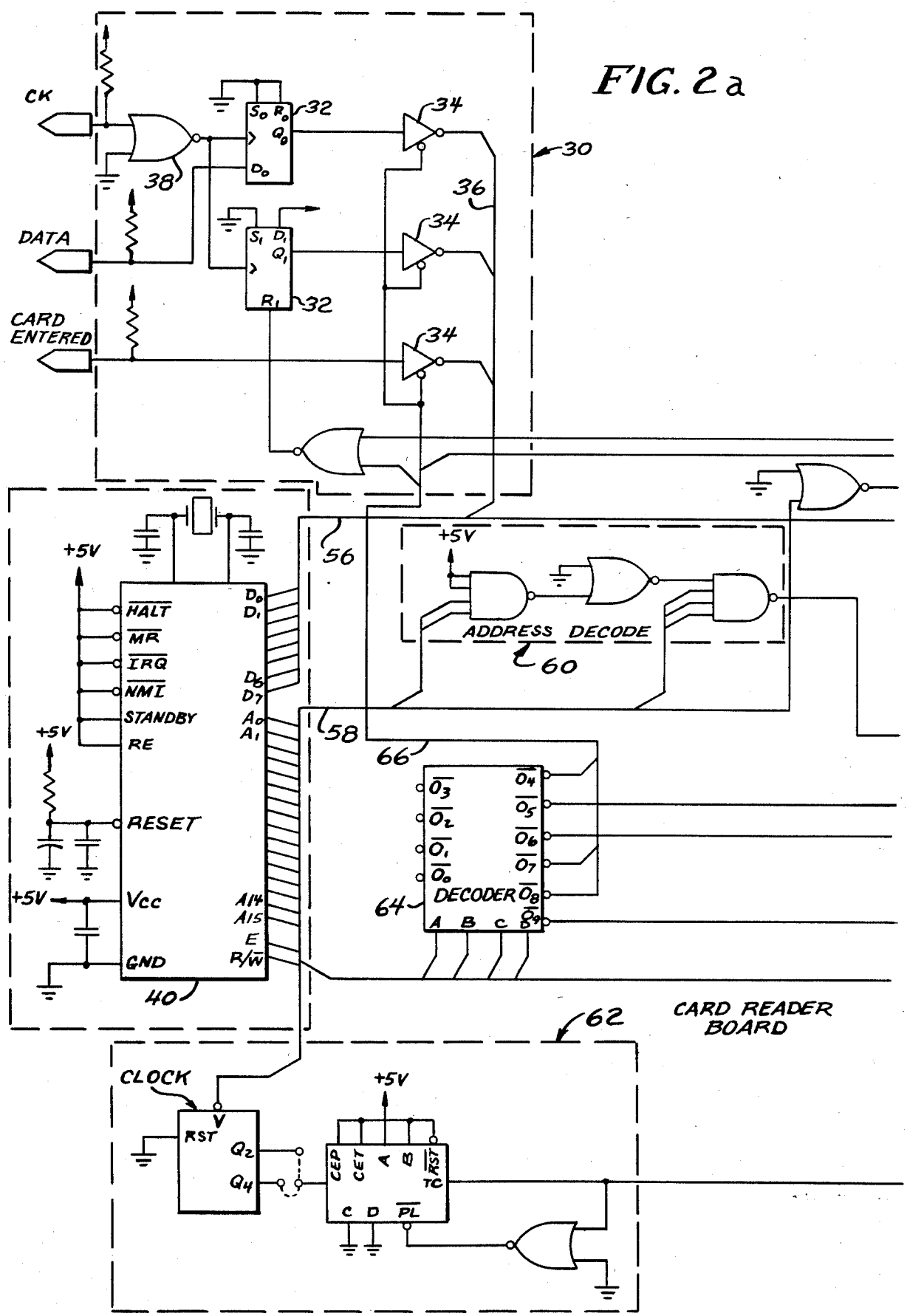

FIG. 2 illustrates the printed circuit board which is associated with the standard card reader. The standard card reader typically has three outputs which correspond to a clock signal, data signals, and a signal indicating that a card has been entered. Correspondingly, the schematic diagram of FIG. 2 shows those same input signals (CLOCK, DATA, CARD ENTERED) being applied to a circuit 30. Circuit 30 includes a pair of D-type latches 32 which receive the clock input and data input from the card reader to a group of tri-stating buffers 34. These buffers are triggered to put data on a bus 36. The CARD ENTERED signal is used to determine when a card is swiped correctly in the card reader by the user. This signal gives the capability to recognize whether the card has stopped or has been improperly placed through the card reader. In this circuit, the clock input is inverted by an OR gate 38. The data is received at the DATA input serially and is held at bus 36 until a microprocessor 40 on this same circuit board addresses the tri-stating buffers 34 which illustratively may be type LS368 devices.

A circuit 42 communicates with a group of indicator lights via pin connectors 44. A red indicator light signifies that the card 18 is invalid. The yellow indicator light indicates that the card should be reinserted. The green indicator light indicates that the system is ready to proceed. Circuit 42 uses a latch 46, typically a type 4042B, which communicates with data outputs of microprocessor 40 via a bus 48. Within circuit 42, line drivers 50 change the voltage from plus five volts to twelve volts to illiminate the lights. Transistor circuits 52 provide the current after receiving inputs from circuits 50. A pair of resistors are coupled in a darlington configuration 54, and these are coupled to the Q0 output of latch 46. Circuit 54 is used to trigger the arcade game.

In the preferred embodiment, microprocessor 40 is a Motorola 6802 microprocessor. The reset delays running of the processor until the remainder of the system has power. The connections to microprocessor 40 include a set of eight data connections D0 through D7 connected to a data bus 56. Further, microprocessor 40 includes sixteen address connections A0 through A15 which are connected to an address bus 58. The MR connnection is the memory ready connection. The IRQ connection is an interrupt request. The NMI connection is a nonmaskable interrupt. The STANDBY connection allows RAM to be saved, and the RE is a RAM control function.

An address decoder 60 is coupled to address bus 58, and it provides decoded addresses for the ROM. The addresses within the ROM are on A0 to A10, and signals on A11 through A15 refer to the particular hardware.

A clock 62 is provided which communicates with various circuits. One of its purposes is in connection with developing a baud rate for signal transfer between card reader 16 and the interface board 24 to which the card reader board is connected.

FIG. 2 also shows a decoder 64 which decodes ten different hardware addresses, of which six are used. It is coupled to receive the address signals on lines A12 through A15, and provides outputs on a decoded output bus 66. It raises a signal to select a hardware component in response to an address.

An asynchronous communications interface adapter (ACIA) 70 is included on the card reader board is coupled to the data bus 56 and address bus 58. It includes an output Tx and an input Rx coupled by line drivers 72 to terminals 74 which connect to a cable for joining card reader board 16 with control unit 10.

The card reader board shown schematicaly in FIG. 2 also includes an EPROM 76 which has 128 bytes of RAM to handle data flow. EPROM 76 stores the executive program for microprocessor 40.

As mentioned, this card reader board includes a coin detector and game trigger shown schematically as circuit 80. Circuits 80 include terminals 82 which are connected to an appropriate sensor. In circuit 80, a clock signal resets a latch 84 to reset a flag which watches the coin trigger mechanism. A pair of tri-stating inverting buffers 86 recognize the coin trigger signal which comes in as high. When the game is triggered, the signal goes low and stays low until the coin drops past. Then the signal returns to high. That signal is recognized by latch 84 which indicates the coin drop. Processor 40 notes the state of latch 84, and when the processor 40 notes the game trigger signal, it records a coin drop. A debounce circuit is employed in circuit 80 in connection with the trigger signal.

Figure 3:
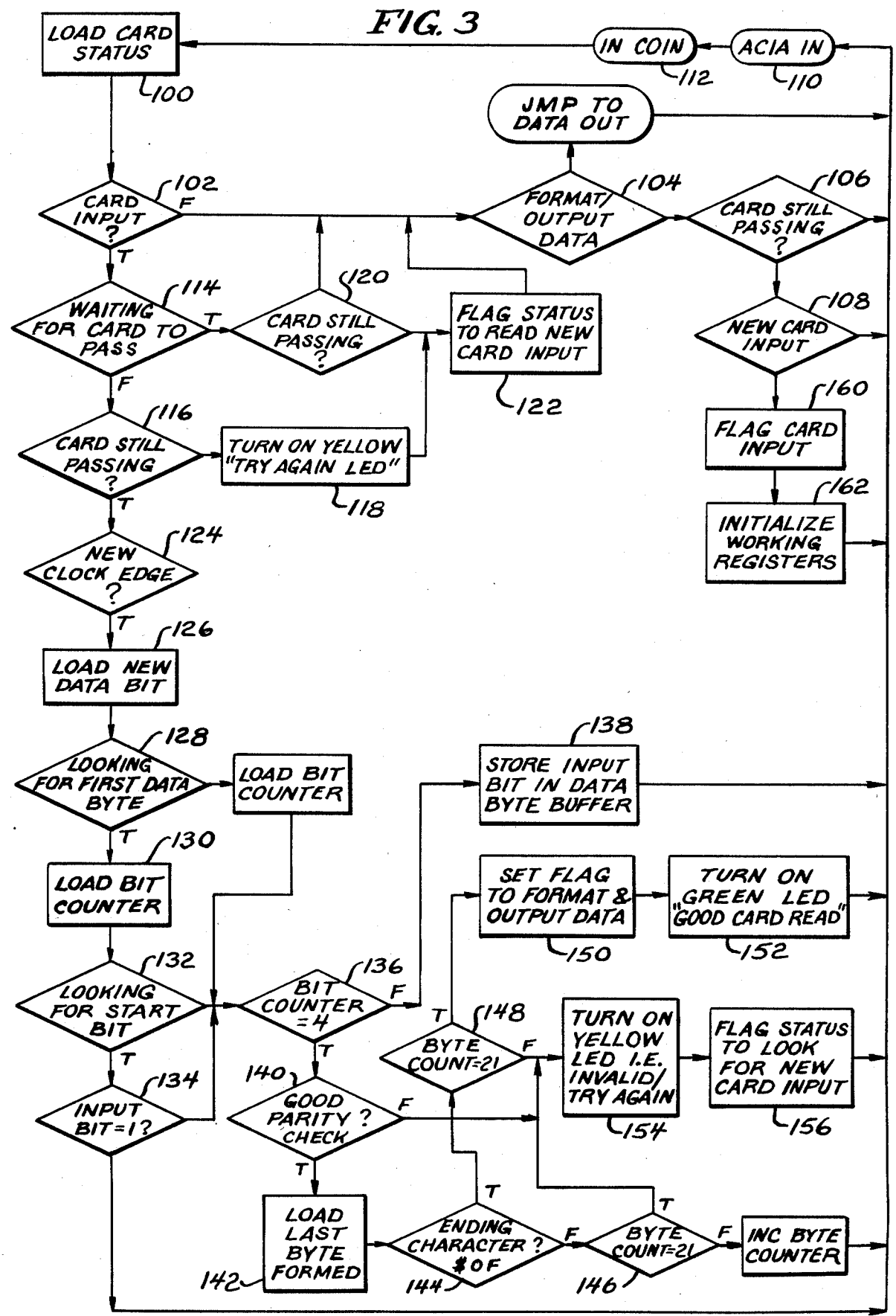
FIGS. 3 and 4 are flow charts illustrating various operations occurring in the circuitry of FIG. 2.

Having now described the general components of the card reader board, its operation may be understood with reference to FIG. 3, a flow chart, which is divided into several portions which fit together. It will be appreciated that the basic operation of the circuit of FIG. 2, the flowchart of FIG. 3, and the card reader is to take data off the magnetic card 18, arrange it into bytes, and send it asynchronously to the interface board 24 in the control unit 10.

Starting at the top left portion of FIG. 3, in block 100, the card status is loaded, and some housekeeping matters and standard initialization of the program are done, including setting up the baud rate for communication with the controller interface 24 (FIG. 1), and setting flags to indicate that no cards have been read.

If a card is entered into the card reader 16 (FIG. 1), then the card reader will cause a signal to be impressed on the input to FIG. 2 marked CARD ENTERED, which will be noted at a decision diamond 102. If no card is entered, the system progresses to a decision diamond 104 which determines whether output data is being formatted. If not, the system progresses to diamond 106 which determines whether a card is still passing through the card reader 16. If not, then the system moves to decision diamond 108 which determines whether there is a new card input. If there is no new card input then the system goes to Point A. Further, if in decision diamond 106, the system determines that a card is still passing card reader 16, then the system moves to an oval 110 which is marked ACIA IN. At this part of the program, the system reads input commands from the interface board 24. After doing this, the system moves to oval 112 marked INCOIN which is a subroutine which looks for coin triggers (in other words, deposits of coins in the arcade game 14). After this is done, the system moves back to block 100.

If decision diamond 102 determines that a card has been entered into card reader 16, which is determined by hardward, the program now moves from diamond 102 to diamond 114. When the card is entered into the card reader 16, a certain interval of time is necessary for the card to pass far enough so that data can start being read, and this is determined at diamond 114. If the system is not waiting for the card to pass, then the flowchart proceeds to decision diamond 116 which determines whether the card is still passing. If the card is no longer passing, then at block 118 the yellow lamp is to be lit (see FIG. 2) which indicates to try the card again.

If decision diamond 114 determines that the system is no longer waiting for the card to pass, then it proceeds to decision diamond 120 which again determines whether the system is still waiting for the card to pass. If so, then the system moves to decision diamond 104 and back through the main loop. If the card is not still passing, as determined at diamond 120, then the status is flagged to read a new card input, as indicated at block 122. Thereafter, the program returns to the main loop entering diamond 104.

If decision diamond 116 determines that the card is still passing, then decision diamond 124 is entered which determines whether there is a new clock edge. If there is no new clock edge, then the flowchart branches to oval 110. If there is a new clock edge, then the system moves to block 126 which loads a new data bit. These data bits are loaded into the tri-stable buffers 34 or the microprocessor 40 of FIG. 2. After this in done, the system moves to decision diamond 128 which determines whether the system is looking for a first data byte. This is done because the system needs to know when it is looking at the beginning of a byte. The first bit in a data byte causes a bit counter to be loaded at block 130. This simply keeps track of the number of bits that have been read.

Next, at decision diamond 132 the system determines whether it has a start bit. If the system is looking for a start bit, the next step is to determine at diamond 134 whether the input bits a "1" or a "0." If it is not a "1" then the system returns to oval 110. If the input bit is a "1" then the next step is to determine at decision diamond 136 whether the bit count is equal to four. If it is not yet equal to four, then an accumulation continues of the bit count at block 138 which stores the input bits in a data byte buffer, where one byte is four bits. Thereafter, the system returns to oval 110 in the flowchart.

If decision diamond 136 determines that the bit count has now reached four, then a byte has been assembled and a parity check is conducted at diamond 140. If the parity is good, then at block 142 the byte is loaded for asynchronous transmittal to the interface board 24 via the ACIA 70 (FIG. 2). Next, decision diamond 144 determines whether the ending character is a particular hexadecimal character OF. If not, then diamond 146 checks to see if the byte count is twenty one as the number of characters which are expected from the card is twenty one. Thus, if decision diamond 144 determines that it has found the ending character OF, then the system moves to diamond 148 which checks to make sure that the byte count indeed is twenty one.

If indeed twenty one bytes have been found, then at block 150 a flag is set to format and output the data. Thereafter, as indicated at block 152, the system turns on the green light which indicates that the card has been read successfully. The connection for the green light is shown in FIG. 2 at the top right portion thereof. Thereafter, the system returns to Oval 110 on the flowchart.

If decision diamond 148 determines that the byte count is not twenty one, then it activates the yellow lamp (see FIG. 2) as indicated at block 154 and, at block 156 sets a flag to look for a new card input. Thereafter, the system returns to oval 110 in the flowchart.

It will be remembered that decision diamond 108 determines whether a new card input is arriving. If a new card input is arriving, then a flag is set at block 160, and working registers are initialized at block 162, after which the system returns to Oval 110. Now, in diamond 102, the status of the flag in block 160 is examined. If decision diamond 102 determines that that flag in block 160 has been set (indicating that there is a new card input), the system moves into the portion of the flowchart which looks at the data. This is the path proceeding to the right from decision diamond 102.

It will be remembered that one function of the card reader in the preferred embodiment is to check corporate and site identifications. This can be done at decision diamond 104, which involves formatting output data. Remembering that the card reader board includes a microprocessor and memory, it will have been programmed, perhaps via commands entered to computer 12 via keyboard 13, to permit cards to be used only if they contain prescribed corporate and site identifications. If the proper identifications are read from the card, then the data normally sent to the computer 12 via control unit 10 will be formatted for outputting beyond reader 12. If an improper corporate or site identification is read, then card reader 16 will not format data for output, but will instead activate the yellow light.

It will be appreciated, of course, that corporate and site checking need not be done, and if done, can be done elsewhere, such as in computer 12. However, it is convenient to check this at card reader 16 so that transmission through the system of data based on improper cards can be truncated immediately.

Figure 4:
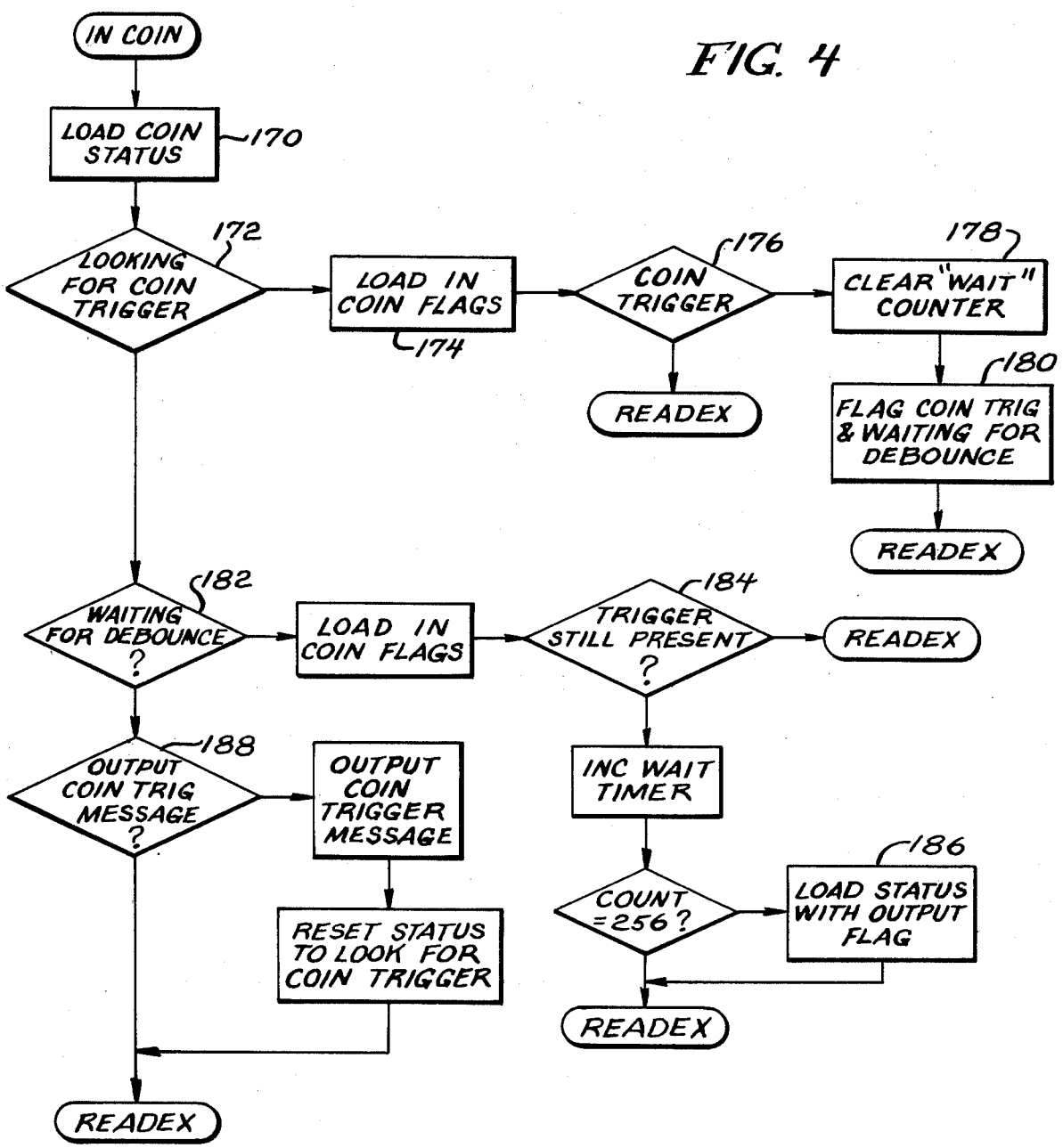

A subroutine INCOIN is shown in FIG. 4 which is designed to watch the coin trigger mechanism in the arcade game 14 and to determine when a coin has been used rather than a card. To do this, this subroutine watches the coin trigger and specifically looks for a change in the current or in the coin trigger mechanism. As shown in FIG. 4, the coin status is loaded at block 170 and then a decision diamond 172 determines whether the system is looking for a coin trigger. If a signal arrives, then "incoin" flags are set at block 174. At diamond 176, the system determines whether this in fact is a coin trigger signal. If true, then the system clears a wait counter at block 178 and sets a flag at block 180 to wait for debounce. The sytem then returns to a background routine called READEX.

Now that the INCOIN subroutine is waiting for debounce, decision diamond 172 will determine that the next step logically in the flowchart is to move downward to block 182. This is the beginning of a second part of the subroutine, which determines whether the trigger is still present at diamond 184. If not, a timer is incremented which corresponds to a 50 millisecond delay. After that delay, then an output flag is set at block 186. A third portion of the INCOIN subroutine involves decision diamond 188 which decides whether to output the COIN TRIGGERED message as shown in FIG. 4.

FIGS. 3 and 4 are flowcharts for the circuit of FIG. 2. Appendix A constitutes a listing of the program in microprocessor 40 in FIG. 2.

FIG. 5 is a diagram representative of the controller board 22 which is very similar to the interface boards 24. The difference between the two boards will be explained infra, but basically concerns drivers connected to an ACIA circuit. Referring to FIG. 5, the controller board 22 includes a microprocessor 200, illustratively a type 6809 with sixteen address lines A0 through A15 and eight data lines D0 through D7. Address lines A11 through A15 are connected to hardware block address decoding circuit 202 which includes, illustratively, an LS138 and LS139. Decoded hardware signals are applied to a decoder circuit 204 which is also connected to an address bus 206. The outputs 208 of decoder 204 are applied to sixteen ACIAs 210 through 225. Each of these ACIAs includes, looking at unit 210, an Rx input and a Tx output, as shown. In the controller board 22, each input Rx of ACIAs 210 through 225 is connected to a respective ACIA located on each of sixteen interface boards 24. FIG. 5 also shows a baud rate select circuit 226 which supplies a baud clock to each of these ACIA devices.

The controller board 22 of FIG. 5 also includes a ROM 228 which stores the program, a RAM 230, RAM timing circuits 232 and further communication circuits. Those further communication circuits include, on the controller board 22, a further ACIA 234 whose output Tx is connected to a driver 236 and whose input Rx is coupled to a further driver 238. Further, timing circuitry 240 and a data line buffer 242 are included as shown. The data line buffer is an octal transciever which buffers data destined for the ACIAs in both directions. It determines when the ACIAs can talk on the bus.

As mentioned, FIG. 5 also is representative of an interface board 24. There are certain differences, however, between FIG. 5 and an interface board 24. In particular, ACIA 234 is not connected to line drivers 236 and 238. Thus, connections from the ACIAs 210 through 225 on the controller board 22 will be made directly to the inputs Tx and Rx of the ACIA 234 on the interface board 24.

Figure 5A:
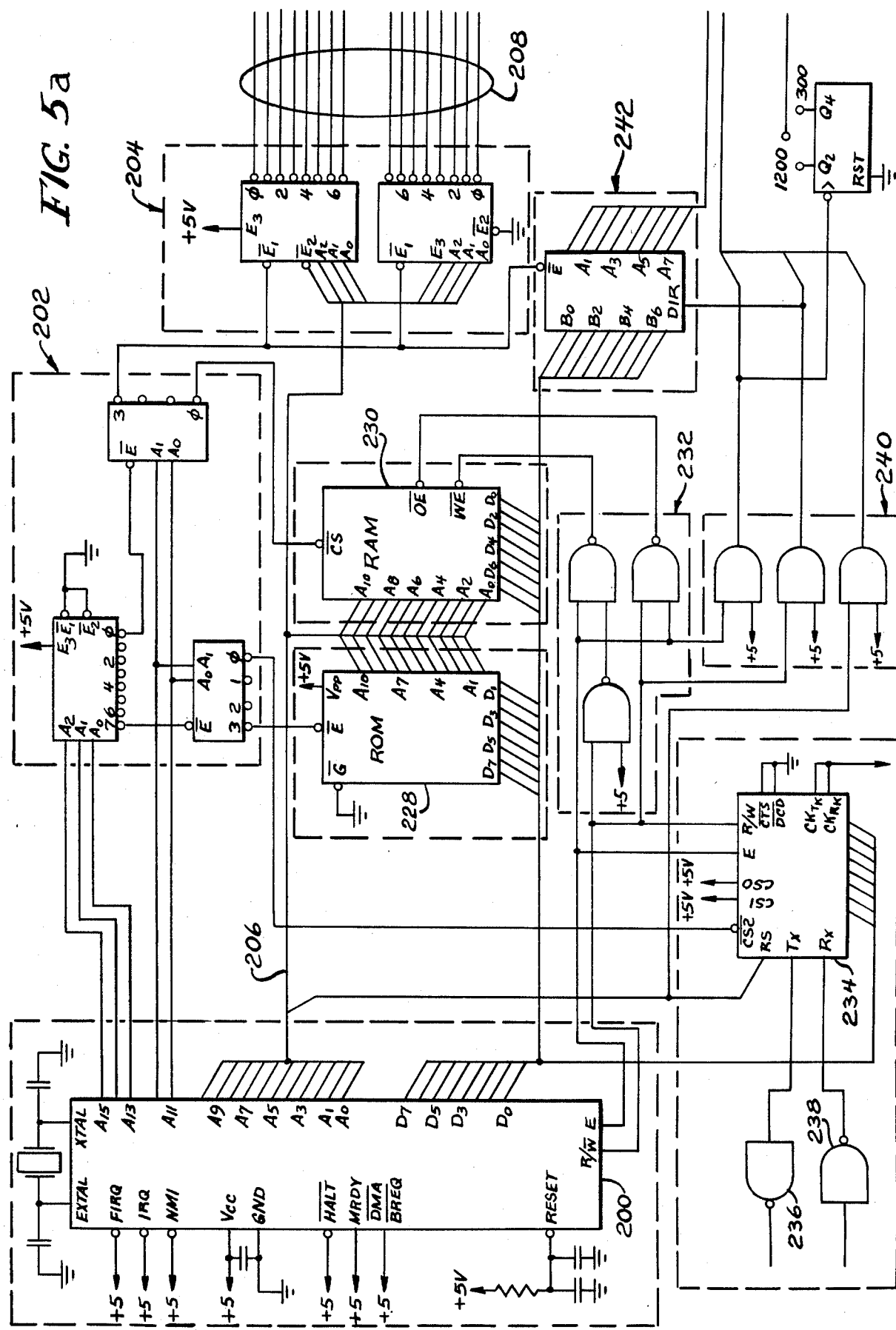
FIGS. 5a and 5b are schematic diagrams of a controller board located in the control unit.
Figure 5B:
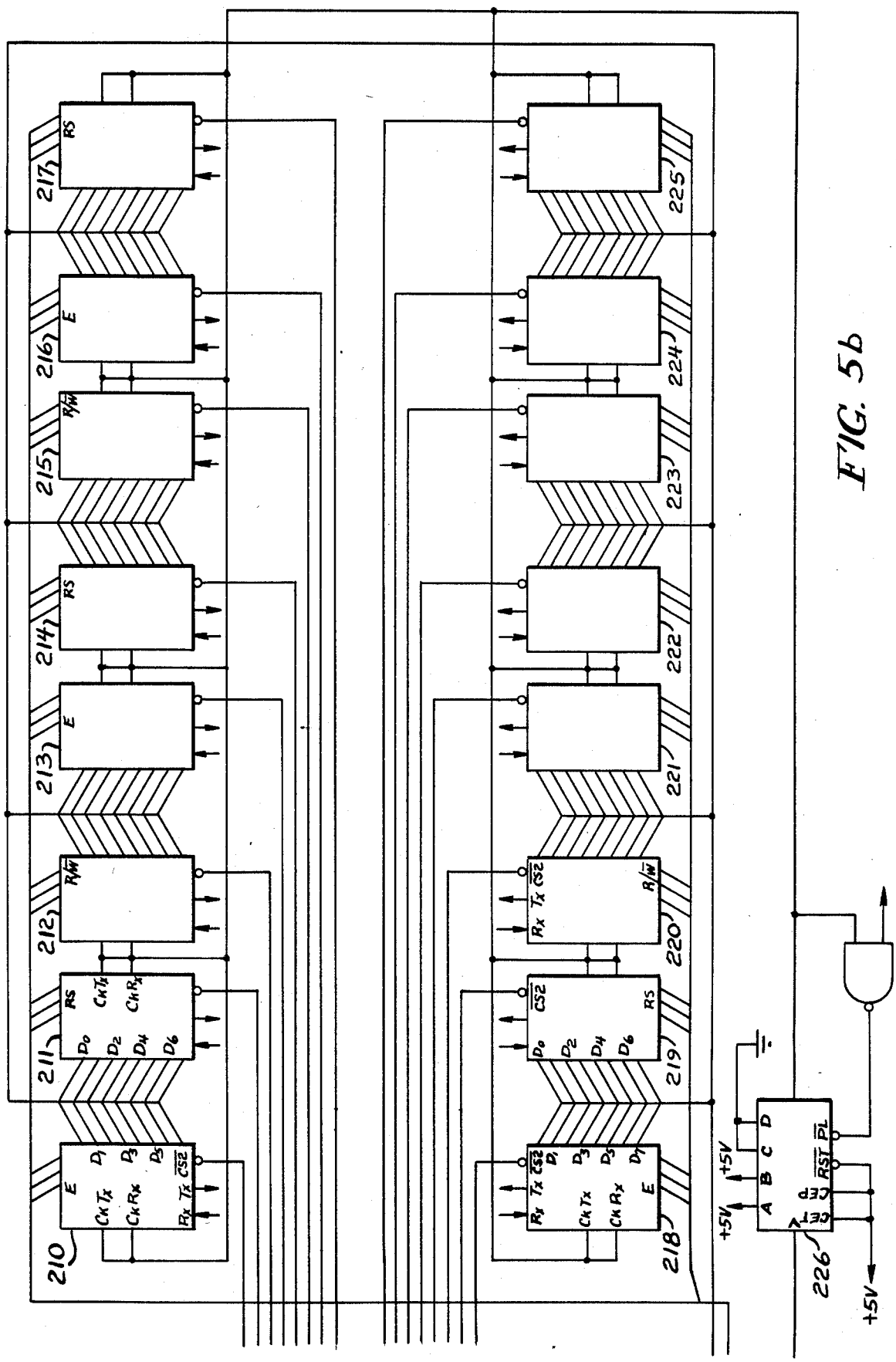
Figure 6:
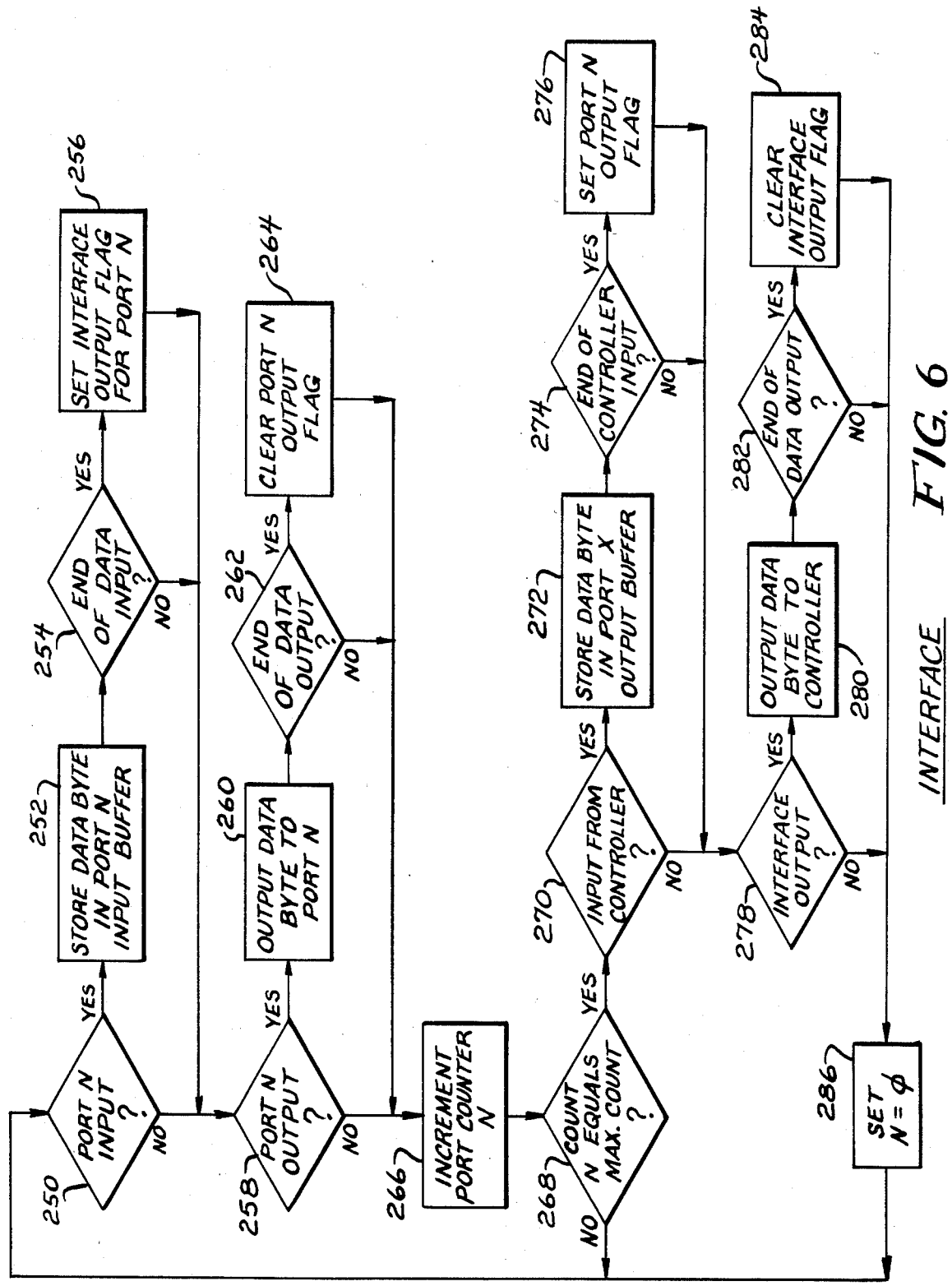
FIGS. 6 and 7 are flow charts for various operations occurring in the interface board and controller board, respectively.

Referring to FIG. 6, there is shown a flow chart representative of the operation of the interface board which is shown as interface base 24 (FIG. 1) and which has been described with reference to FIGS. 5a and 5b. The flow chart of FIG. 6 begins at the top left portion with decision diamond 250 determining whether an input has been received from any port N. If so, then a data byte is placed in an input buffer for port N as shown in box 252. Next, at decision diamond 254, microprocessor 200 determines whether it has the end of a data input. If so, it sets an interface output flag for port N, at block 256. If decision diamond 254 finds that it has not reached the end of the data input, or after the interface output flag has been set, then the system moves to decision diamond 258 which determines whether it has an output at port N. If so, it outputs a data byte to port N as shown at block 260. After that, decision diamond 262 determines whether the data output has ended. If so, it clears the port N output flag at block 264 and moves to block 266. Another way to reach block 266 is if decision diamond 262 shows that the data output has not ended. Still a further way is if decision diamond 258 determines that there is no output at port N. Block 266 increments a counter for port N and thereafter the system moves to decision diamond 268. Here, a decision is made as to whether the count for port N, called count N, equals a maximum count. If not, the system returns to diamond 250. If so, however, then the system moves to decision diamond 270 which checks for an input from controller 22. If there is an input, then at block 272 the system stores the data byte in a port X output buffer. Thereafter, decision diamond 272 checks to see whether it has received the end of the controller input. If so, at block 276, the system sets an output flag for port N and then moves to decision diamond 278. Another way to reach diamond 278 is if the decision diamond 274 determines that it has not reached the end of the controller input. At decision diamond 278, the system determines whether there is an interface output. If so, at block 280, it outputs a data byte to the controller. Next, decision diamond 282 determines whether it has reached the end of the data output, and if so, it clears the interface output flag at block 284. If not, or after the interface output flag is set, the sytem resets the counter for port N to zero at block 286 and returns to decision diamond 250.

Figure 7:
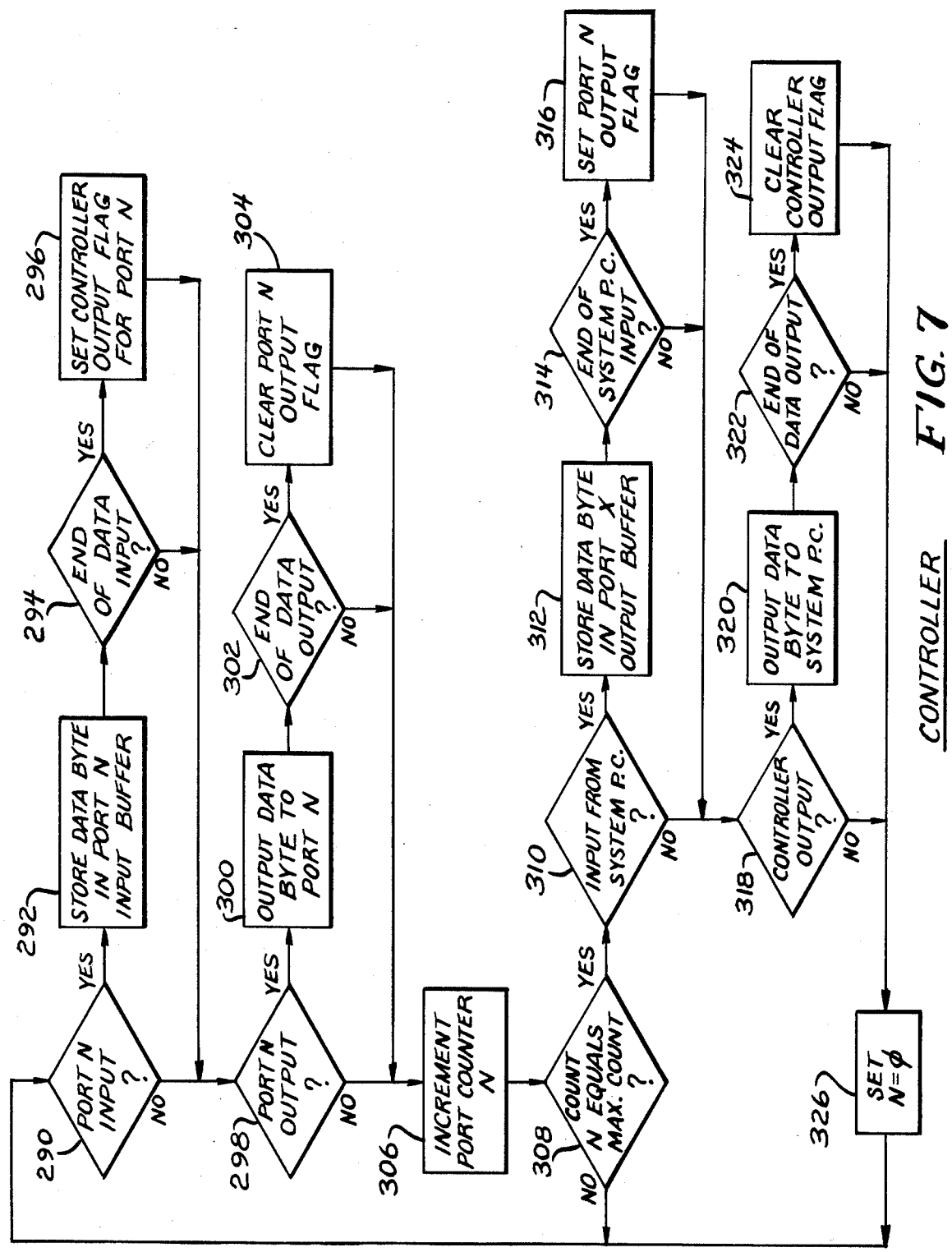

The operation of the controller board is very similar and is illustrated in FIG. 7. Beginning at the top left, it includes a decision diamond 290 to determine whether there is an input at port N. This entire flowchart of FIG. 7, which includes elements 290 through 326, is completely analogous to the flow chart of FIG. 6. The difference, however, resides in that it sets an output controller flag at block 296 instead of an interface output flag at block 256 (FIG. 6). Further, when checking for inputs at diamond 310, it looks for inputs from the computer 12 rather than from the controller 22 as shown at diamond 270 (FIG. 6). The flow chart of FIG. 7 outputs data to the system personal computer 12 as shown at block 320, whereas the flow chart of FIG. 6 outputs data to the controller board as shown at block 280.

The communication between a card reader and computer 12 involves handshaking protocols, as mentioned. Specifically, in the preferred embodiment when data is to be sent from a card reader 16 to computer 12, the reader 16 sends a request to transmit signal to its interface base 24, and interface 24 then acknowledges the request. Next, reader 16 sends the data to base 24, but locally stores the data it is sending. Interface 24 then sends a request to transmit to controller 22, and after receiving an acknowledgment signal in response, sends data thereto. Similarly, once control board 22 has the data, it sends a request to transmit to computer 12, and on receipt of an acknowledgment therefrom, sends the data to computer 12.

Next, computer 12 tries to verify this data it has received. Basically, it sends the data back to the card reader 16 which sent the data. It does this by sending a request to transmit to controller 22, gets an acknowledgment, and sends. Controller 22 does the same with the interface base 24. Interface 24 does the same with the card reader 16. Now the card reader has received what the system thinks is a copy of what card reader 16 sent in the first place. Reader 16 checks such "return data" and verifies its accuracy to computer 12. If the data is not accurate, retransmission occurs followed by another attempted verification.

It is to be understood that the invention is not limited to the specific featues shown, but that the means, method and construction herein disclosed comprise the preferred mode of putting the invention into effect, and the invention is, therefore, claimed in any of its forms or modifications within the legitimate and valid scope of the appended claims.

What is claimed is:

1. A system for controlling access to an equipment which has a control device associated therewith operative in response to an activation signal to permit usage of said equipment, the system comprising:
 a portable data-carrying device;
 a reader associated with said equipment for obtaining data from said data-carrying device;
 a data center communicating with said reader;
 a data entry device for communicating to said data center data regarding said portable data-carrying device, said data center being responsively coupled to said data entry device and operative for establishing a data record in said data center representative of a number of activations of said equipment, said number corresponding to said portable data-carrying device, said data center also being coupled to said reader for receiving data contained on said data-carrying device when it is transmitted to said data center via said reader, said data center responding to receipt of said data from said reader by examining the data record within said data center corresponding to said data-carrying device and selectively activating the control device and adjusting said data record to account for such current activation, said data center also refraining from activating the control device if said data record shows no further activations of the equipment are warranted by the portable data-carrying device.

2. The system of claim 1 wherein said data-carrying device comprises a card having a magnetic stripe encoded with data.

3. The system according to claim 1 wherein said data center includes a computer and said data entry device includes a keyboard communicating with said computer, whereby said keyboard can be used to validate selected portable data carrying devices.

4. The system according to claim 1 further including means for receiving and reading data-carrying devices and communicating data regarding received data-carrying devices to said data center, said data center responsively coupled thereto for adjusting its data record corresponding to the received data-carrying device.

5. The system according to claim 1 wherein said data entry device includes a dispenser of said portable data-carrying device, said dispenser communicating data regarding cards to said data center.

6. The system according to claim 5 wherein said dispenser includes means for receiving money and, in response thereto, issuing a data-carrying device representative of a predetermined number of activations of said equipment, said dispenser then communicating data regarding such dispensing to said data center.

7. The system according to claim 5 wherein said data-carrying device is a card and wherein said data entry device is a dispenser for said card, said dispenser, upon issuing said card, communicating the card identity to said data center.

8. The system according to claim 7 wherein said card includes data regarding card identity and site identity, and wherein said card dispenser is coupled to communicate the card identity and site identity to said data center.

9. A system for controlling access to multiple equipment units each having a respective control device associated therewith operative in response to an activation signal to permit usage of one of said equipment units, the system comprising:
 a plurality of readers each associated with a respective one of said equipment units for obtaining data from any of said data-carrying devices;
 a data center communicating with each of said readers;
 a data entry device for communicating data regarding said data-carrying devices to said data center, said data center being responsively coupled to said data entry device and operative for establishing a data record in said data center for each of said portable data-carrying devices, said data record containing data representative of a number of activations of said equipment for the corresponding data-carrying device;
 said data center also being coupled to said readers for receiving data contained on said data-carrying devices, said data center responding to receipt of said data from any of said readers by examining the data record within said data center corresponding to said data-carrying device and selectively activating the control device at said equipment unit associated with said reader and adjusting said data record to account for such current activation, said data center also refraining from activating the control device if said data record shows no further activations of equipment are warranted by the corresponding portable data-carrying device.

10. The system according to claim 9 wherein said data-carrying devices include cards each having a magnetic stripe containing data.

11. The system according to claim 9 wherein said data center includes a computer and said data entry device includes a keyboard communicating with said computer, whereby said keyboard can be used to cause the data center to create or adjust a data record respecting a data-carrying device.

12. The system according to claim 9 wherein said data entry device includes a dispenser for dispensing said portable data-carrying devices, said dispenser communicating data regarding cards to said data center.

13. The sytem according to claim 12 wherein said dispenser is responsive to receipt of money and dispenses a data-carrying device corresponding to an amount of money which has been received and a predetermined number of activations of any of said equipment units.

14. The system according to claim 13 wherein said dispenser includes means for receiving and reading data-carrying devices, and communicating data regarding a received data-carrying device to said data center, whereby data-carrying devices representative of no further activations can be returned to said dispenser for reactivation of the data-carrying device.

15. The system according to claim 12 wherein said data entry devices are cards dispensed by said dispenser, each card carrying card identification data, and wherein said data entry device communicates the card identification data to said data center in connection with the dispensing of said card, and wherein said card further includes site identification data, and wherein said data entry device communicates site identification to said data center.

16. The system according to claim 9 including means responsive to the depositing of money for dispensing a card containing card identification data, said data entry device communicating the card identification data to said data center thereby to cause said data center to establish a data record therein representative of a number of activations of said equipment unit corresponding to said amount of money, whereby a person seeking access to any of the controlled equipment units can deposit money at said means responsive thereto and receive a card, representative of the amount of money deposited, to permit the person to obtain a controlled number of activations of any of the control equipment units.

17. The system according to claim 9 further including keypad reader means for reading a data-carrying device and for entering data via the keypad portion thereof, said data center being responsively coupled to said keypad reader for adjusting the data record corresponding to said data-carrying device to permit added activations of said equipment units.

18. The system according to claim 17 wherein said data center further includes a control unit coupled to a computer and to said readers.

19. The system according to claim 18 wherein said control unit includes a controller circuit and plural interface circuits, each interface circuit being coupled to at least one respective reader.

20. The system according to claim 19 wherein each of said interface circuits communicates with plural respective readers associated with corresponding equipment units.

21. A system for controlling access to an arcade of electronic, electrical, or electromechanical games each having a respective control device associated therewith operative in response to an activation signal to permit usage of said game, the control system comprising:
 a plurality of portable cards each carrying data thereon;
 a plurality of readers for reading the data carried on any of said cards, each reader being associated with a respective game and communicating therewith, whereby a user can insert a card into the reader for the game which the user wants to play;
 a data center communicating with each of said readers;
 a data entry device for communicating data regarding said cards to said data center, said data center being responsively coupled to said data entry device and operative for establishing a data record in said data center for each of said cards representative of a number of plays corresponding to the respective card;
 said data center also being coupled to each of said readers for receiving data carried on any of said cards inserted into a reader, examining the data record corresponding to the inserted card, and activating the control device if the number of game plays represented by said card has not been exhausted, and in connection with said activation, adjusting said data record to account for the current game play, said data center disallowing the play of the game associated with the reader into which the card has been inserted if the data record for that card shows that no further game plays correspond to the inserted card.

22. The system according to claim 21 including a dispenser responsive to the receipt of money for dispensing a card representative of a predetermined number of game plays.

23. The system according to claim 22 wherein said card carries card identification data, and wherein said data entry device communicates said card identification data to said data center.

24. The system according to claim 23 wherein said card carries site identification data and wherein said data entry device communicates said site identification data to said data center in connection with dispensing said card.

25. The system according to claim 22 further including return means for receiving returned cards, reading said returned cards and communicating data respecting said returned cards to said data center.

26. The system according to claim 25 wherein said return means further includes means responsive to the return of a predetermined number of cards for dispensing a further card representative of a preselected number of game plays.

27. the system according to claim 21 wherein each of said card readers has a data processing circuit associated therewith for assembling data from the card reader, the data processing circuit communicating said data to said data center.

28. The system according to claim 27 wherein said card reader has associated therewith an indicator means for signaling the results of reading the data on said card by the card reader.

29. The system according to claim 28 wherein said indicator means signals an improper reading of the data carried on said card, and a proper reading thereof.

30. The sytem according to claim 21 wherein said data center includes a computer and a control unit, the control unit being coupled to said computer and to said card readers.

31. The system according to claim 30 wherein said control unit includes a controller circuit and a plurality of interface circuits, each interface circuit communicating with a plurality of said card readers.

32. The system according to claim 30 wherein said control unit and said computer are remotely and securely located from the arcade of games thereby to permit control over the access to the computer and control unit while permitting unrestricted access by prospective users to the arcade of games, whereby money may be collected and cards can be dispensed to game players who will be unable to use their cards to play any of the games in the arcade by inserting the card into the card reader which communicates with the remotely located control unit and computer which, in turn, permits controlled access to the selected game, while at the same time protecting access to the control system.

33. A method for controlling access to multiple equipment units each having a respective control device associated therewith and operative in response to an activation signal to permit usage of one of said equipment units, the method comprising:
 establishing a data record for each of a plurality of data-carrying devices corresponding to the predetermined number of activations alloted to each of said data-carrying devices;
 dispensing data-carrying devices, each carrying data identifying the data-carrying device;
 reading a data carrying device at a location proximate to an equipment unit which has been selected for activation by the bearer of the data-carrying device;
 communicating the card identification from the card which has been read to a data center;
 determining whether the data record corresponding to the card which has been read corresponds to any number of activations, and if so, then permitting usage of said selected equipment unit and adjusting the data record to decrease the number of further activations to be permitted to the bearer of said data-carrying device, and if no further activations correspond to the data-carrying device, then prohibiting activation of the equipment unit.

* * * * *

UNITED STATES PATENT AND TRADEMARK OFFICE
CERTIFICATE OF CORRECTION

PATENT NO. : 4,575,622
DATED : March 11, 1986
INVENTOR(S) : Frank J. Pellegrini

It is certified that error appears in the above—identified patent and that said Letters Patent is hereby corrected as shown below:

Claim 9, column 12, line 43, after "comprising" insert --a plurality of portable data-carrying devices;--

Claim 13, column 13, line 16, "sytem" should be --system--.

Claim 27, column 14, line 60, "the" should be --The--.

Claim 30, column 15, line 4, "sytem" should be --system--.

Signed and Sealed this

Twenty-second Day of July 1986

[SEAL]

Attest:

DONALD J. QUIGG

Attesting Officer     Commissioner of Patents and Trademarks

(12) EX PARTE REEXAMINATION CERTIFICATE (4852nd)
United States Patent
Pellegrini

(10) Number: US 4,575,622 C1
(45) Certificate Issued: Sep. 30, 2003

(54) ELECTRONIC ACCESS CONTROL SYSTEM FOR COIN-OPERATED GAMES AND LIKE SELECTIVELY ACCESSIBLE DEVICES

(75) Inventor: Frank J. Pellegrini, Hoffman Estates, IL (US)

(73) Assignee: Dark Horse Trading Co., Inc., Naperville, IL (US)

Reexamination Request:
No. 90/005,768, Jul. 14, 2000

Reexamination Certificate for:
Patent No.: 4,575,622
Issued: Mar. 11, 1986
Appl. No.: 06/518,426
Filed: Jul. 29, 1983

Certificate of Correction issued Jul. 22, 1986.

Related U.S. Application Data

(63) Continuation-in-part of application No. 06/497,590, filed on May 24, 1983, now abandoned.

(51) Int. Cl.[7] .................................................. A03F 9/24
(52) U.S. Cl. ........................................... 463/25; 463/40
(58) Field of Search .............................. 463/40, 41, 42, 463/25, 29, 43; 235/382, 382.5

(56) References Cited

U.S. PATENT DOCUMENTS

| | | | | |
|---|---|---|---|---|
| 3,716,697 A | * | 2/1973 | Weir | 235/61.9 R |
| 4,339,798 A | * | 7/1982 | Hedges et al. | 364/412 |
| 4,467,424 A | | 8/1984 | Hedges et al. | 364/412 |
| 4,513,199 A | * | 4/1985 | Sidline | 235/449 |

FOREIGN PATENT DOCUMENTS

GB    1 558 521   *   1/1980   ............. G07F/7/08

OTHER PUBLICATIONS

"Roulabette: A New Concept", Kenilworth, 1979–1982.*

* cited by examiner

Primary Examiner—Julie Brocketti

(57) ABSTRACT

An access control system for coin operated games and the like in its preferred embodiment includes cards with magnetic strips carrying identifications of the cards. The cards are obtained from a card dispenser in response to deposit of money. A keyboard is used to enter data into a computer to create a data control for determining which cards are valid for uses of the electronic games. Alternatively, the card dispenser can communicate the identification of cards being dispensed to the computer. The user takes the card and inserts it into a card reader which is located at the game selected for play. The card reader reads the card and determines whether the card contains proper corporate and site identifications. If so, the card reader communicates the card identification to the computer which determines, by examining data record for that card, whether any further game plays are alloted to that card. If there are further game plays, the computer adjusts its data record to decrease the number of remaining plays which will be permitted, and activates the selected game. After a predetermined number of game activations for any particular card, the computer will disallow further activations so that the card is no longer valid. At that point, the card can be returned to a card dispenser which can read the card identification of the returned card and communicate that information to the computer which can revalidate the card for use when it is again dispensed in response to deposit of money. This system provides secure control over electronic equipment because the computer record and the means for creating it are located at a secure location.

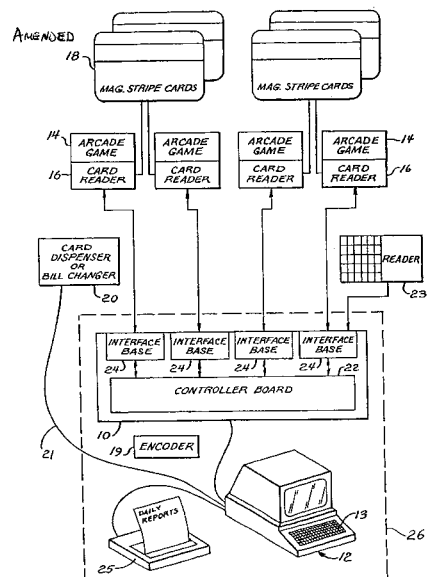

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

Reference numeral 26 added to FIG. 1.

AS A RESULT OF REEXAMINATION, IT HAS BEEN DETERMINED THAT:

The patentability of claims 21–33 is confirmed.

Claims 1–20 are cancelled.

* * * * *